United States Patent [19]
Giles

[11] 3,762,533
[45] Oct. 2, 1973

[54] CONVEYOR STRUCTURE
[75] Inventor: James Giles, Franklin Park, Ill.
[73] Assignee: American Chain & Cable Company Inc., New York, N.Y.
[22] Filed: Mar. 18, 1971
[21] Appl. No.: 125,563

[52] U.S. Cl............................................. 198/127 R
[51] Int. Cl............................................ B65g 13/02
[58] Field of Search........................ 198/127, 34, 40

[56] References Cited
UNITED STATES PATENTS
3,251,452  5/1966  Conway................................. 198/40
2,701,049  2/1955  Kendall............................ 198/127 R
3,528,537  9/1970  Shultz..................... 198/34

Primary Examiner—Richard E. Aegerter
Attorney—Barnes, Kisselle, Raisch & Choate

[57] ABSTRACT

An article spacer and stop mechanism for metering and spacing articles on a conveyor comprising a conveyor along which the articles are moved, a stop movable into and out of the path of the conveyor, and means responsive to the spacing of the articles for interrupting succeeding articles until predetermined spacing is produced between the articles. The stop derives power from the conveyor for movement to and from article interrupting positions.

29 Claims, 5 Drawing Figures

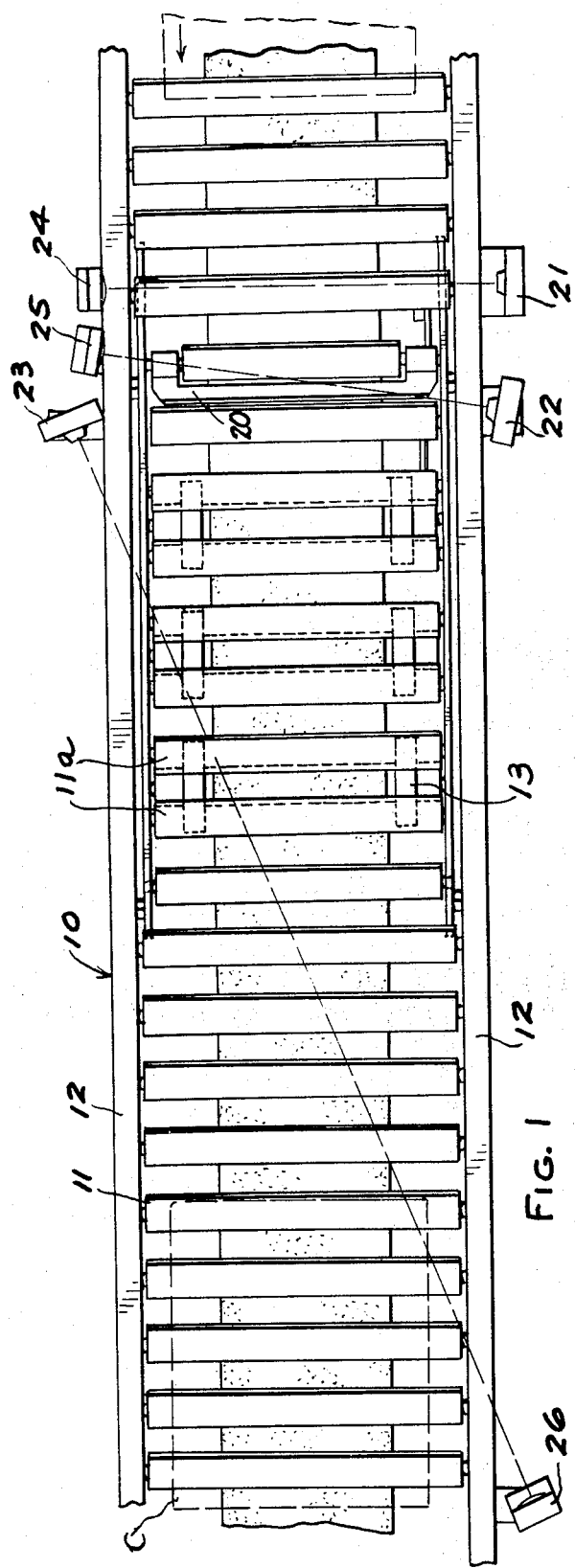
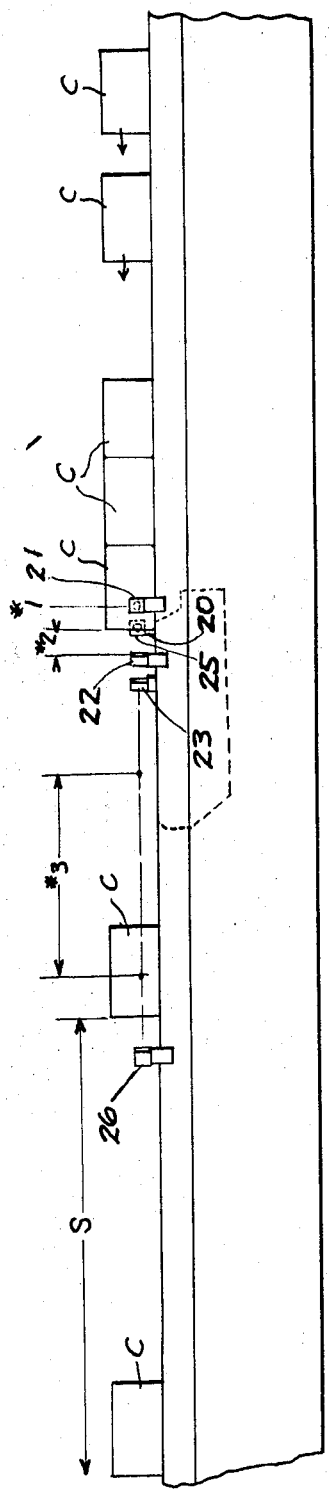

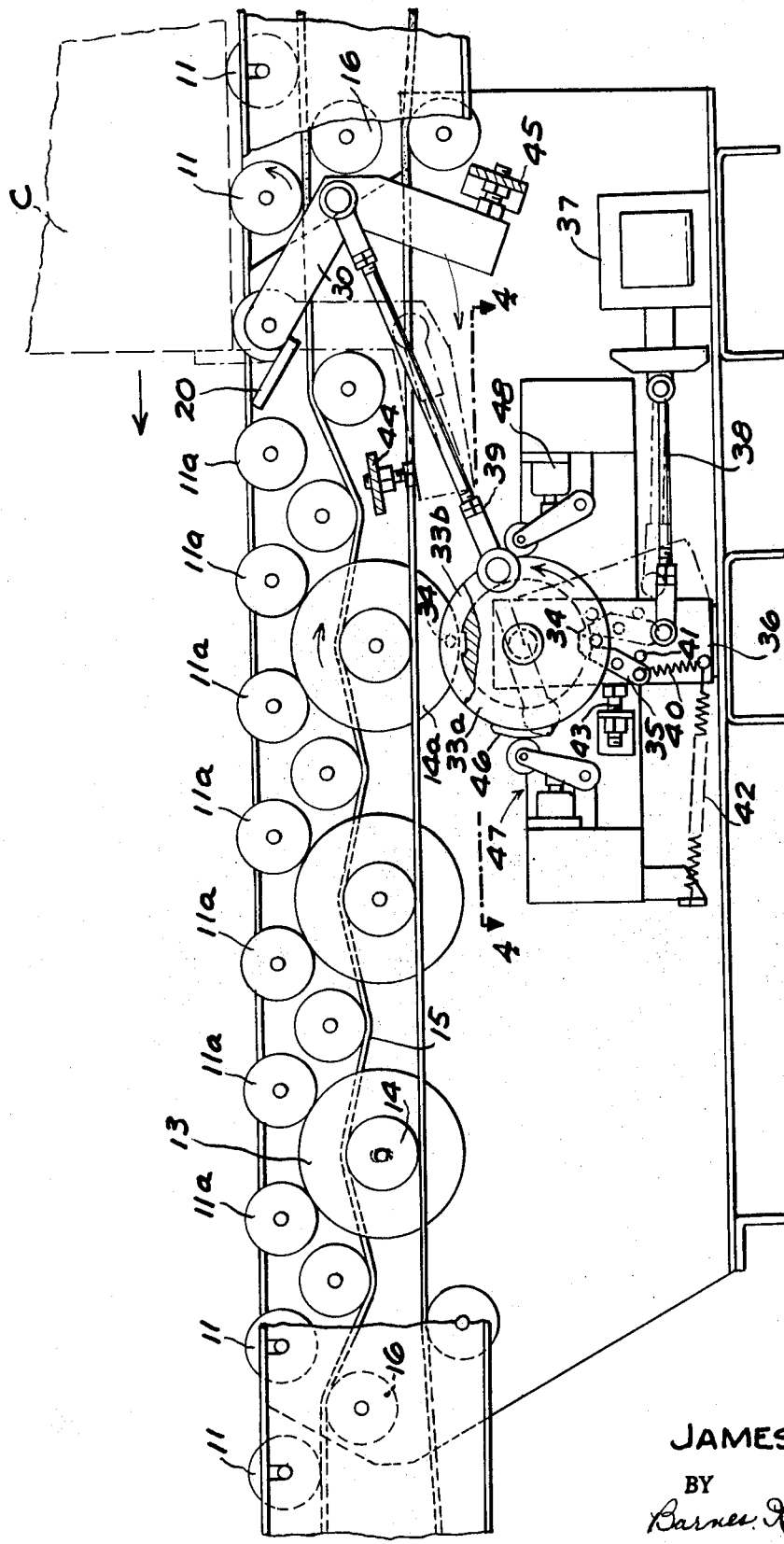

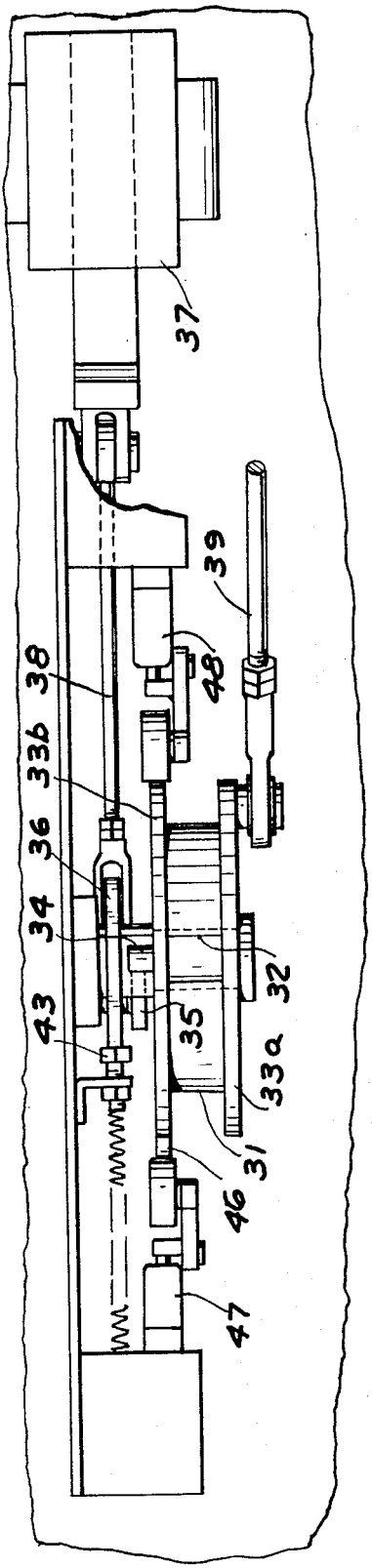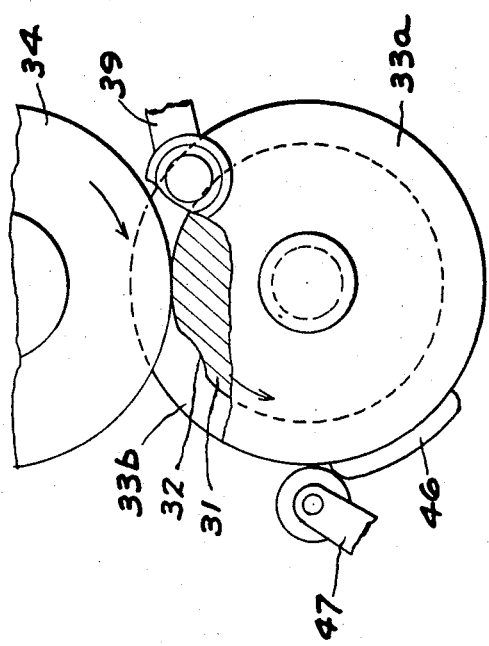

CONVEYOR STRUCTURE

This invention relates to conveyors and particularly to conveyors for moving articles thereon at a predetermined spacing.

BACKGROUND OF THE INVENTION

In the handling of articles such as containers on conveyors, it is often desirable to space the articles on the conveyor in order that they can be handled in the proper fashion as, for example, diverting, counting and the like.

Among the objects of the invention are to provide conveyor construction wherein proper spacing is provided between successive articles; wherein the spacing can be maintained even between articles of differing sizes; wherein the structure can be readily applied in a conventional conveyor at any point; which occupies little space; which does not require any additional drive mechanism but derives power for moving the stop from the conveyor; and which is relatively inexpensive and simple in construction.

SUMMARY OF THE INVENTION

An article spacer and stop mechanism for metering and spacing articles on a conveyor comprising a conveyor along which the articles are moved, a stop movable into and out of the path of the conveyor, and means responsive to the spacing of the articles for interrupting succeeding articles until predetermined spacing is produced between the articles. The stop derives power from the conveyor for movement to and from articles interrupting positions.

DESCRIPTION OF THE DRAWINGS

FIG. 1 is a fragmentary plan view of a conveyor embodying the invention.

FIG. 2 is a diagrammatic elevational view of the conveyor shown in FIG. 1.

FIG. 3 is a fragmentary part sectional elevational view on an enlarged scale of a portion of the conveyor shown in FIG. 1.

FIG. 4 is a fragmentary plan view of the portion of the conveyor shown in FIG. 3 taken along the line 4—4 in FIG. 3.

FIG. 5 is a fragmentary elevational view on an enlarged scale of a portion of the apparatus shown in FIG. 3 in a different operative position.

DESCRIPTION

Referring to FIG. 1, the apparatus embodying the invention comprises a conveyor 10 including a plurality of transversely extending rollers 11 rotatably supported between side frame members 12 and are driven by engagement with a driven belt which frictionally engages rollers 11. The apparatus is adapted to receive successive articles or containers C and produce a desired spacing S between the successive containers (FIG. 2).

As shown in FIG. 3, at an intermediate portion of the conveyor 10, rollers 11a are adapted to be rotated at an increased speed by contact with accelerated drive rollers 13 which have an intermediate portion thereof 14 engaged with the conventional drive belt 15. The drive belt 15 normally drives the remaining rollers 11 by frictional engagement as shown on the left and right in FIG. 3 wherein pressure rollers 16 hold the belt 15 against the rollers 11. Rotation of the rollers 11 advances the articles C along the conveyor. As each article C reaches the rollers 11a, it is accelerated in its movement causing it to move rapidly away from succeeding articles C.

If in the area where the rollers 11a are positioned the spacing between the articles is improper, then a case or article stop 20 is adapted to be moved into the path of the succeeding articles C to hold the succeeding articles C until the spacing is proper (FIG. 2).

The control of the stop 20 is achieved by the use of light beams 21, 22 and 23 and associated light sensitive devices such as photocells 24, 25 and 26. The light cells thus divide the conveyor into zones 1, 2 and 3 shown in FIG. 2.

When a plurality of cases of products arrive at the spacer, the leading case passes through zone 1 and zone 2 and is accelerated forward by rollers 11a into zone 3 to interrupt the light beam in zone 3. It is possible for a long case to break all three light beams at the same time, but the case stop cannot come up while the beam in zone 2 is interrupted. This allows spacing of different length cases. When the light beam in zone 3 is interrupted and the light beam in zone 2 is clear, any case breaking the light beam in zone 1 raises the case stop. When zone 3 is clear, the case stop goes down, releasing the next case. The angle and length of the light beam in zone 3 determines the spacing distances.

The roller case stop 20 is mounted on the end of one leg of an L-shaped lever 30 pivoted at said one end adjacent the conveyor. Case stop operating cam or a disc 31 wider than the lagged disc 14a on an accelerator roller 11a is rotatably positioned beneath disc 14a and has two recesses 32 thereon 180 degrees apart on the same radius (FIG. 3). These recesses 32 give clearance between the cam disc 31 and the lagged disc 14a on accelerator roller 11a when the case stop 20 is idling in the up or down position. Cam disc 31 includes a larger diameter, but thinner discs 33a, 33b fastened on each side of the cam disc 31. Two pins 34 are provided on the inner disc 33b, 180° apart on the same radius (FIG. 4). These pins 34 are selectively engaged by a pawl 35 on a ratchet lever 36 which is connected to a solenoid 37 through the solenoid linkage 38. The case stop lever 30 is connected by a link 39 to the outer disc 33a.

A spring 40 yieldingly urges pawl 35 against a stop 41 on lever 36. A spring 42 yieldingly urges ratchet lever 36 against an adjustable stop 43. Adjustable lever stops 44 and 45 are adjusted to stop the travel of the lever 30 just before the pivot points on the case stop link 39 and the case stop cam 31 are in alignment.

In the idle position of the case stop 20, when either up or down, the case stop cam 31 is in the idle position as shown in FIG. 3.

The operation of the case stop 20 is as follows: If, when the light beam in zone 3 is interrupted, and zone 2 is clear, indicating there is improper spacing, another case or article breaks the light beam in zone 1 the solenoid 37 is energized.

Energization of the solenoid 37 pulls the ratchet lever 36 counterclockwise as viewed in FIG. 3 causing the pawl 35 to engage a pin 34 on case stop operating cam 31 and thereby partly revolve cam 31. This particular revolution causes the case stop operating cam 31 to bring the case stop link 39 past the center and, at the same time, engages the cam 31 with the lagged disc 3 on accelerator roller 14a. This provides a friction drive which revolves the cam 31 180° and raises the case stop 20. This brings the cam 31 back to the idle position again but at a position 180° from its original position. When the cam 31 revolves 180°, a projection 46 on disc 33b shown on the sketch actuates a switch 47 opening the circuit and de-energizing solenoid 37. The ratchet lever 38 is thus returned and is ready for the next cycle.

When zone 3 is cleared, the solenoid 37 is again energized. This repeats the cycle bringing the case stop 20 down. This time the projection 46 opens a switch 48 on the other side, again de-energizing the solenoid 37.

This cycling continues as long as there are underspaced cases passing this point.

I claim:

1. The combination comprising
a conveyor along which articles are supported and moved,
a stop movable into and out of the path of the articles,
means for moving said stop into and out of the path of the articles and operable for deriving power from the conveyor to move the stop into and out of the path of the articles, and
control means responsive to the presence of an article in a predetermined zone and to the spacing between successive articles and operable when the spacing is less than a predetermined distance to momentarily engage the stop moving means with the conveyor and thereby actuate said stop moving means to move said stop into the path of the articles.

2. The combination set forth in claim 1 including means in advance of said stop for driving a portion of the conveyor at an increased speed.

3. The combination set forth in claim 1 wherein said means for moving said stop into and out of the path of said articles comprises rotatable means, and
eccentric means interconnecting said rotatable means and said stop,
whereby in one position of said rotatable means, said stop is in the path of the articles, and in another position of said rotatable means, said stop is out of the path of said articles.

4. The combination comprising
a conveyor along which articles are supported and moved,
a stop movable into and out of the path of the articles,
means for moving said stop into and out of the path of the articles and operable for deriving power from the conveyor to move the stop into and out of the path of the articles, and
control means responsive to the presence of an article in a predetermined zone and to the spacing between successive articles and operable when the spacing is less than a predetermined distance to momentarily engage the stop moving means with the conveyor and thereby actuate said stop moving means to move said stop into the path of the articles,
said means for moving said stop into and out of the path of said articles comprising rotatable means, and
eccentric means interconnecting said rotatable means and said stop,
whereby in one position of said rotatable means, said stop is in the path of the articles, and in another position of said rotatable means, said stop is out of the path of said articles,
said control means including latch means for holding said rotatable means in one position wherein said stop is in the path of the articles and in another position wherein said stop is out of the path of the articles.

5. The combination set forth in claim 3 wherein said control means includes means operable upon a signal to rotate said rotatable means into driving engagement with said conveyor whereby said rotatable means achieves a driving relationship therewith to the other of said positions.

6. The combination set forth in claim 5 wherein said control means comprises a ratchet lever and a pawl thereon adapted to engage and partly revolve said rotatable means.

7. The combination set forth in claim 5 wherein said rotatable means comprises a disc having circumferentially spaced recesses therein.

8. The combination set forth in claim 7 wherein said conveyor has a continuously rotating drive roller mounted thereon,
said roller normally positioned adjacent one of said recesses,
whereby upon rotation of said disc by said control means, the portion of said disc adjacent a recess is moved in frictional engagement with said drive roller of said conveyor.

9. The combination set forth in claim 8 including means for limiting the movement of said stop into and out of article stopping position.

10. The combination set forth in claim 9 wherein said control means includes electrical means for moving said ratchet lever.

11. The combination set forth in claim 10 including means responsive to predetermined movement of said disc for returning said ratchet lever to its original position and thereby interrupting the movement of said control disc in a position such that the other of said recesses is adjacent said drive roller of said conveyor.

12. The combination set forth in claim 11 wherein said stop is fixed to one end of an L-shaped lever that is pivotally mounted adjacent the conveyor.

13. The combination comprising
a conveyor comprising a plurality of driven rollers along which articles are supported and moved,
a stop movable into and out of the path of the articles,
means for moving said stop into and out of the path of the articles and operable for deriving power from the rollers of the conveyor to move the stop into and out of the path of the articles, and
control means responsive to the presence of an article in a predetermined zone and to the spacing between successive articles and operable when the spacing is less than a predetermined distance to momentarily engage the stop moving means with the conveyor and thereby actuate said stop moving means to move said stop into the path of the articles.

14. The combination set forth in claim 13 including means in advance of said stop for driving a portion of the conveyor at an increased speed.

15. The combination set forth in claim 13 wherein said conveyor comprises a plurality of rollers and means for driving said rollers.

16. The combination set forth in claim 13 wherein said means for moving said stop into and out of the path of said articles comprises rotatable means, and
eccentric means interconnecting said rotatable means and said stop,
whereby in one position of said rotatable means, said stop is in the path of the articles, and in another position of said rotatable means, said stop is out of the path of said articles.

17. The combination comprising
a conveyor along which articles are supported and moved,
a stop movable into and out of the path of the articles,
means for moving said stop into and out of the path of the articles and operable for deriving power from the conveyor to move the stop into and out of the path of the articles, and
control means responsive to the presence of an article in a predetermined zone and to the spacing between successive articles and operable when the spacing is less than a predetermined distance to momentarily engage the stop moving means with the conveyor and thereby actuate said stop moving means to move said stop into the path of the articles,
said control means comprising non-contact means.

18. The combination comprising
a conveyor comprising a plurality of driven rollers along which articles are supported and moved,
a stop movable into and out of the path of the articles,
means for moving said stop into and out of the path of the articles and operable for deriving power from the rollers of the conveyor to move the stop into and out of the path of the articles, and
control means responsive to the presence of an article in a predetermined zone and to the spacing between successive articles and operable when the spacing is less than a predetermined distance to momentarily engage the stop moving means with the conveyor and thereby actuate said stop moving means to move said stop into the path of the articles,
said control means comprising non-contact means.

19. The combination comprising
a conveyor comprising a plurality of driven rollers along which articles are supported and moved,
a stop movable into and out of the path of the articles,
means for moving said stop into and out of the path of the articles and operable for deriving power from the rollers of the conveyor to move the stop into and out of the path of the articles, and
control means responsive to the presence of an article in a predetermined zone and to the spacing between successive articles and operable when the spacing is less than a predetermined distance to momentarily engage the stop moving means with the conveyor and thereby actuate said stop moving means to move said stop into the path of the articles,
said means for moving said stop into and out of the path of said articles comprising rotatable means, and
eccentric means interconnecting said rotatable means and said stop,
whereby in one position of said rotatable means, said stop is in the path of the articles, and in another position of said rotatable means, said stop is out of the path of said articles,
said control means including latch means for holding said rotatable means in one position wherein said stop is in the path of the articles and in another position wherein said stop is out of the path of the articles.

20. The combination set forth in claim 19 wherein said control means includes means operable upon a signal to rotate said rotatable means into driving engagement with said conveyor whereby said rotatable means achieves a driving relationship therewith to the other of said positions.

21. The combination set forth in claim 20 wherein said control means comprises a ratchet lever adapted to engage and partly revolve said rotatable means.

22. The combination set forth in claim 21 wherein said rotatable means comprises a disc having circumferentially spaced recesses therein.

23. The combination set forth in claim 22 wherein said conveyor has a continuously rotating drive roller mounted thereon,
said roller normally positioned adjacent one of said recesses,
whereby upon rotation of said disc by said control means, the portion of said disc adjacent a recess is moved in frictional engagement with said drive roller of said conveyor.

24. The combination set forth in claim 23 including means for limiting the movement of said stop into and out of article stopping position.

25. The combination set forth in claim 24 wherein said control means includes electrical means for moving said ratchet lever.

26. The combination set forth in claim 25 including means responsive to predetermined movement of said disc for returning said ratchet lever to its original position and thereby interrupting the movement of said control disc in a position such that the other of said recesses is adjacent said drive roller of said conveyor.

27. The combination set forth in claim 26 wherein said stop is fixed to one end of an L-shaped lever that is pivotally mounted adjacent the conveyor.

28. The combination comprising
a conveyor along which articles are supported and moved,
a stop movable into and out of the path of the articles,
means for moving said stop into and out of the path of the articles and operable for deriving power from the conveyor to move the stop into and out of the path of the articles, and
control means responsive to the presence of an article in a predetermined zone and to the spacing between successive articles and operable when the spacing is greater than a predetermined distance to momentarily engage the stop moving means with the conveyor and thereby actuate said stop moving means to move said stop into the path of the articles.

29. The combination comprising
a conveyor comprising a plurality of driven rollers along which articles are supported and moved,
a stop movable into and out of the path of the articles, means for moving said stop into and out of the path of the articles and operable for deriving power from the rollers of the conveyor to move the stop into and out of the path of the articles, and control means responsive to the presence of an article in a predetermined zone and to the spacing between successive articles and operable when the spacing is greater than a predetermined distance to momentarily engage the stop moving means with the conveyor and thereby actuate said stop moving means to move said stop into the path of the articles.

* * * * *